March 25, 1941.  W. E. URSCHEL ET AL  2,236,226
PROJECTOMETER
Filed Feb. 15, 1939  2 Sheets-Sheet 1
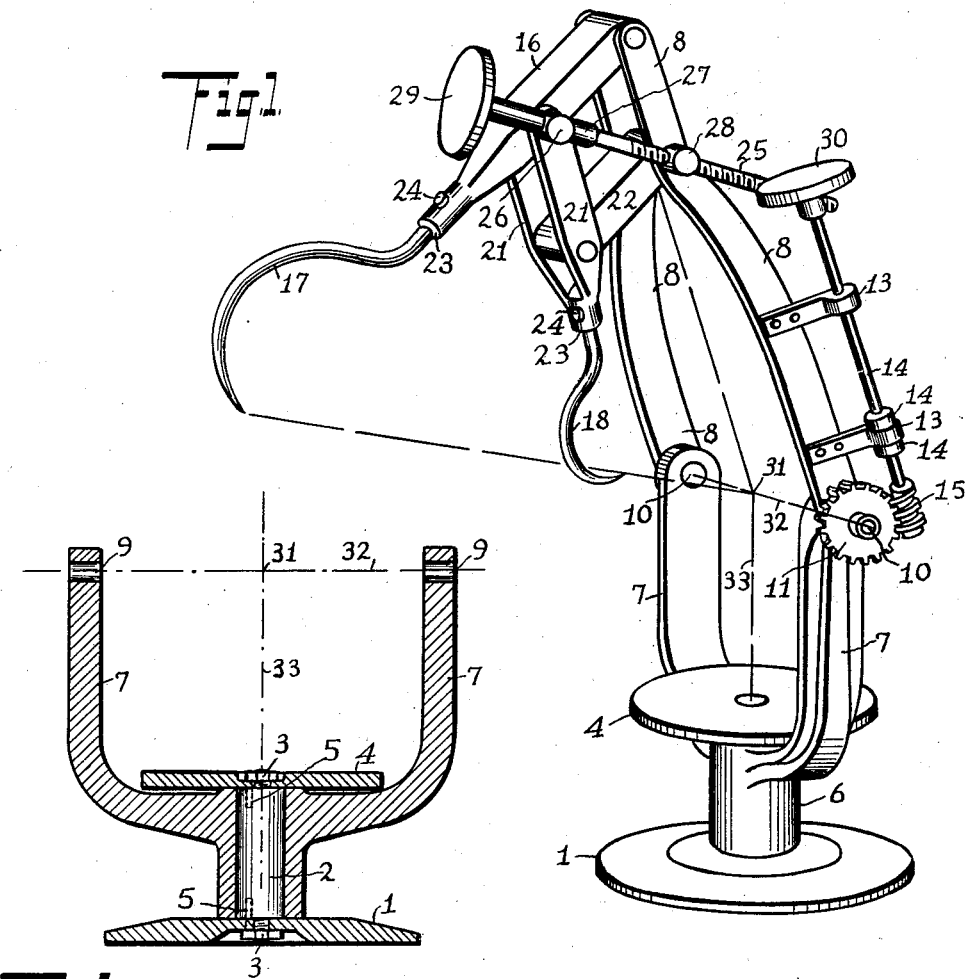
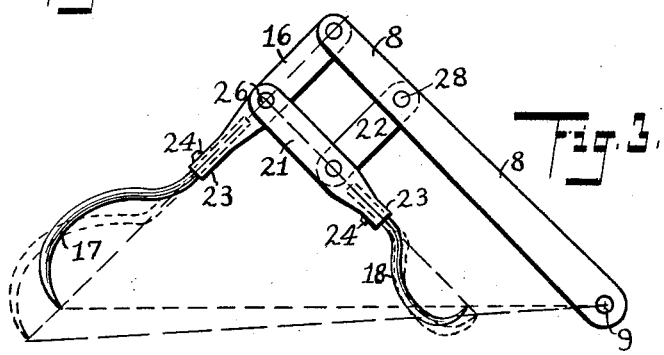
William E. Urschel
Gerald W. Urschel
INVENTORS
BY M. S. Austutz
ATTORNEY March 25, 1941.

W. E. URSCHEL ET AL
PROJECTOMETER 2,236,226

Filed Feb. 15, 1939

William E. Urschel
Gerald W. Urschel
INVENTORS

BY N. S. Amstutz
ATTORNEY

Patented Mar. 25, 1941

2,236,226

UNITED STATES PATENT OFFICE 2,236,226

PROJECTOMETER

William E. Urschel and Gerald W. Urschel, Valparaiso, Ind.

Application February 15, 1939, Serial No. 256,594

10 Claims. (Cl. 33—174)

Our invention relates to improvements in projectometers and it more especially includes the features pointed out in the annexed claims.

The purpose of our invention is to provide a simple device of universal applicability that will enable anyone of ordinary skill to definitely and exactly produce an enlargement in shell or solid form of a given object, such as a statue, etc.; that employs two points of reference or comparison which are at interrelated distances from the given junction of horizontal and vertical center lines intersecting the object that is to be enlarged; that provides means for coordinately shifting the comparison points in a vertical direction at different distances from the junction of the center line or the critical center, according to the variation of the surface contour of the object; that provides means for shifting the comparison points on arcs of revolution around a horizontal center; and also provides cooperating means for swinging the points of comparison on horizontal planes throughout a complete circle. The points are at different distances from the critical center of comparison, the one nearest such center spotting the contour of that portion of the object that is being enlarged, the companion point being farther away at any desired ratio of enlargement, but always in line with the other pointer and the center of comparison which is the comparable point of the enlargement.

The relation of the reference points is based on the geometric relation of a parallelogram in which the end of one arm serves as a pivot and the two points are at interrelated pivotal distances from such pivot. In substance, the members of the parallelogram, the comparison points, and the inter-pivoting of the members, constitutes a pantographic structure adapted to relative universal movement around an object.

With these and other ends in view, there is illustrated in the accompanying drawings such an instance of adaptation as will disclose the cooperating features of our invention, without limiting it to the specific details shown thereon and described herein.

Fig. 1 is a perspective view of the device.

Fig. 2 is an elevation in section of the pantograph support and its vertical pivot, showing two upstanding projections which establish the horizontal axis around which the pantograph and its pointers are moveable on different planes.

Fig. 3 is a diagrammatic elevation of a parallelogram showing the ratio of enlargement between the two comparison points and their relation to a pivoting center.

Figure 4:
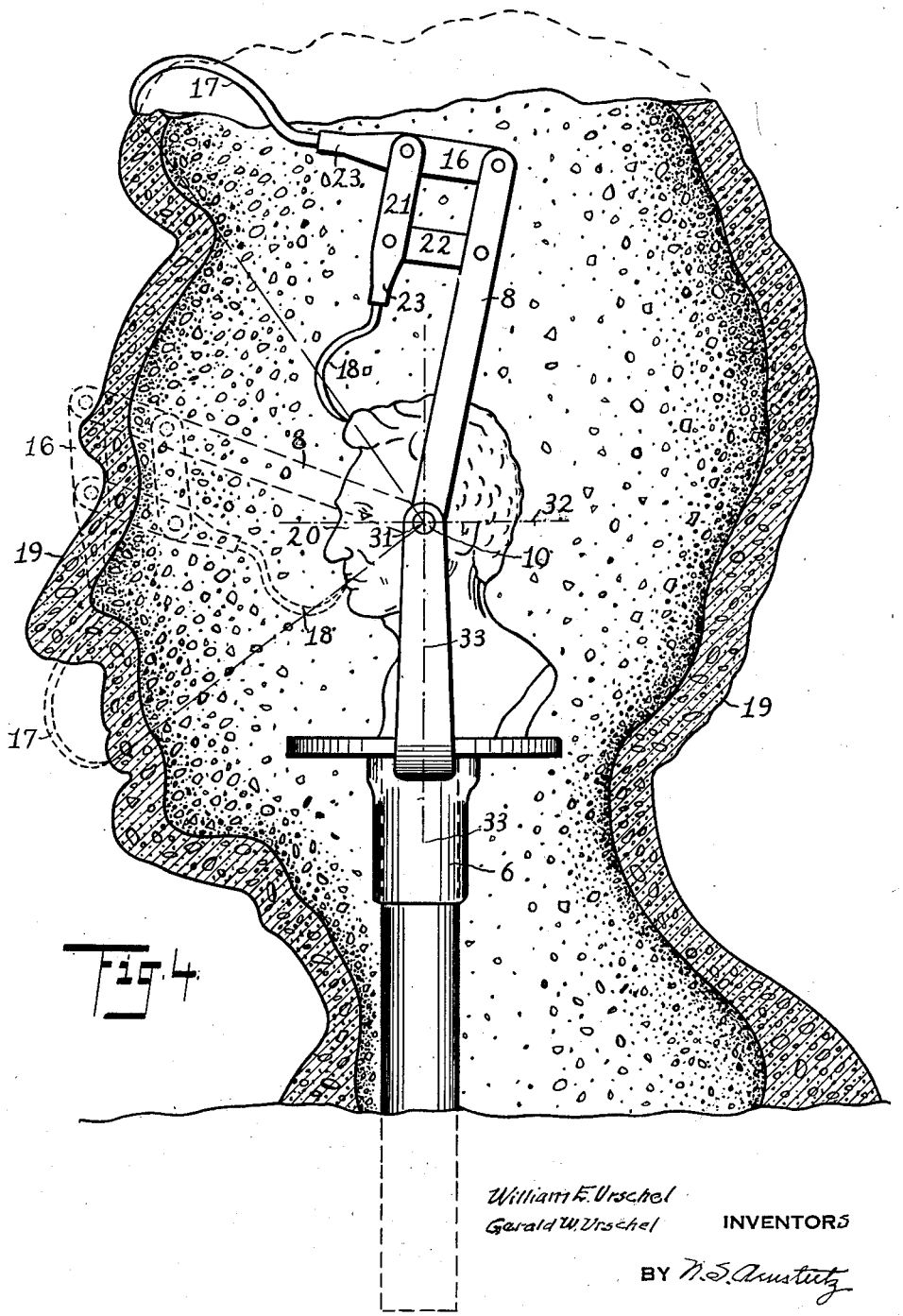
Fig. 4 is an enlarged elevation in section showing a small size statuette and a corresponding enlargement of it as an external shell with the mechanism in position on its inside. The reference points are shown in full lines in one position and in dotted lines at another point.

In the use of our projectometer, we may employ whatever alternatives or equivalents, in the proportion of parts and their interactions, that the exigencies of various conditions may demand without departing from the broad spirit of the invention.

The device may have a base such as shown in Fig. 1 or it may be supported on a pedestal as shown in Fig. 4. Reverting to Figs. 1 and 2, any suitable circular base 1 may be provided. This base may have a vertical stem 2 formed integrally therewith or if desired it may be a separate piece which may be held in place on the base by means of a nut 3 on a threaded reduced diameter of the stem. The upper end of this stem 2 may be similarly provided with a reduced diameter threaded extension adapted to also receive a nut 3 to hold the table 4 attached to the stem. In order that the stem 2, the base 1, and the table 4 may be held in fixed relation to each other, suitable dowel pins 5 may interconnect the separate parts.

Between the supporting table 4 and the base 1, a horizontally rotatable member 6 is pivoted on the stem 2. This member has two upstanding arms 7 which at their upper ends form two horizontal pivots, on which the long links 8 of the pantograph are pivoted at 9—10. These arms are pivoted by means of any suitable form of pins or screws 10 which are placed in openings 9. At one side the pivot pin 10 is extended so as to receive a stationary worm gear 11. On the long link 8 of the pantograph and practically parallel with it a manipulating shaft 12 is secured in bearings 13. Collars 14 limit the endwise movement of the shaft and at its lower end a worm 15 is provided which engages the teeth of the worm gear 11.

At the outer ends of the two links 8 of the pantograph, a pivoted extension 16 forms one side of the pantograph. It carries a relative large pointer 17 which indicates the spot on the enlargement 19 which corresponds to the position of the small pointer 18 on the object 20. Parallel to the link 8 a short bifurcated link 21 is pivoted to the upper member or extension 16 and a short bar 22 parallel to the upper member 16 is pivoted to the long link 8 and the short bifurcated or slotted link 21. At the bottom end of this short link a relatively small searching or tracing point 18 is secured. Both points 17 and 18 are adjustable in their sockets 23 and are held by set screws 24.

From one pivot 26 of the pantograph diagonally to the other pivot 28, an adjusting screw 25 is positioned. It has bearing in an extension of the pivot 26. A collar 27 holds it against lengthwise movement. The extension of the other pivot 28 is threaded to receive the adjusting screw 25. These two pivot members 26 and 28 retain their alignment with each other and the screw 25 regardless of the position of the elements of the pantograph. A knurled hand wheel 29 is on the outer end of the screw 25 and a similar wheel 30 is on the shaft 12.

The movement of the pantograph pointers 17 and 18 produced by the screw 25 is substantially toward or away from the critical center 31, on a fixed vertical plane, while the movement of the worm 15 is to shift the pantograph pointers in arcs of movement around the horizontal axis 32. This axis and its intersection with the vertical axis 33 establishes the critical center 31.

In short the pantograph comprises the two long links 8 pivoted at their bottom ends to the upright supports 7. At their upper end these links are brought near together to receive the extension 16 and a parallel short bar 22. As stated, the outer end of the bar 22, the slotted link 21 is pivoted to the extension 16 and the bar 22. In fact, each one of the four intersecting parts 8, 16, 21 and 22 of the pantograph are pivoted to each other.

The comparison pointers 17 and 18 are held in position by set screws 24 or otherwise. In Fig. 3, the enlarging principle of a parallelogram is illustrated. As the angles of the parallelogram whether small or large are always comparable with each other, the distance the farthest pointer 17 is away from the pivot point 9 of the link 8 in comparison to the distance away the tracing point 18 is located, determines the ratio of enlargement. To provide room for the object the upstanding arms 7 are spaced apart and the long links 8 of the pantograph at their lower end are similarly spaced apart.

In reproducing a statuette on an enlarged scale it is started at the bottom and it is gradually built upwards. An opening is left at the top through which to remove the device. This opening is subsequently closed as desired.

To operate our device, the statue or object 20 to be enlarged is placed upon the table or plate 4 and firmly secured thereon by any central dowel pin or adhesives, to prevent shifting during the time an enlargement 19 is being made. The lowest points of the object are found by placing the small pointer 18 against the object at the desired place which is to be enlarged. By doing this the other pointer 17 is in an exactly comparable position at the place where the enlargement is being made. Other points on the same horizontal plane are recognized by revolving the arms 7, attached pantograph and pointers 17 and 18 so as to fix points for the enlargement at desired circumferential intervals, on the same horizontal plane.

After sufficient points have been established at a given elevation, the pointers are raised to a next higher elevation and other variations of contour are established at this changed elevation according as the surface adjacent the pointer 18 of the object is farther or nearer to the critical center 31. This procedure is carried on at increasing elevations, selected at such intervals as may be found desirable, until the enlargement is completed.

The machine is not limited to any definite ratio of enlargement, as the ratios may be changed by moving the pointers in or out in their respective sockets, so that the pointers remain in line with each other and the center of the pivot 9 as shown in Fig. 3.

The result produced may consist of cement or similar material which is built from the outer surface toward the center of the object in any desired thickness to provide the requisite strength. A solid construction may be formed by building the plaster from the critical center outward to form a mold into which, after hardening, cement or other material may be poured to form a solid head, after which the shell may be removed. In any event the tactile movements of the small pointer as it traces the contours of the object results in a faithful enlargement.

The use of the terms horizontal and vertical are relative and are not to be considered as geometric limitations because it is obvious that the device can be operated as a unit at any other selected angle.

What we claim is:

1. A projectometer for enlarging objects such as statuary or the like which comprises a suitable base, a vertical extension mounted on the base, a table or support at the upper end of the extension, a member pivoted on the extension, a projection pivoted to the member on a horizontal axis and movable around such axis in a vertical plane, a plurality of interpivoted parts constituting a pantograph on the projection said parts supporting reference points at different distances from the horizontal axis whereby a movement of one point is followed by a correspondingly larger movement of the other point on any horizontal or vertical plane.

2. A projectometer for enlarging an object such as a statuette or the like which comprises a suitable base, a projection therefrom, a table positioned on the projection in spaced apart relation to the base, a member pivoted for horizontal rotation on the projection between the base and the table, a pair of vertical projections on such member in diametrical spaced apart relation, a pair of relatively long links pivoted to the upper ends of the projections on a horizontal axis, a plurality of pantographic members pivoted to the links one of such members carrying a short tracing point and another of said members carrying an enlarging or reference point, means for adjusting the points simultaneously on vertical planes independently of the horizontal axis of the projections and the links, and means for shifting the pointers to different related distances from the critical center of the device whereby one pointer will define the contours of the object and the other pointer will establish the corresponding contour of the enlargement on as many different vertical planes as may be desired.

3. In projectometers for enlarging objects such as statuary or the like, a suitable support for holding the object in a definite stationary position thereon, a base, a stud on the base to hold the support against turning, a pointer for contacting the surface of the object, a second pointer for defining a similar position on an enlarged scale comparable to the surface of the object that is adjacent the tracing point, means for supporting the pointers in relation to the base to position the tracing pointer at variable elevations opposite different surface contours of the object, and means for moving the pointers as a unit on a horizontal plane throughout 360 degrees whereby the configuration of the object on an enlarged scale on any plane is indicated by the second pointer.

4. A projectometer for enlarging statuary which comprises a suitable base, a stud projecting upward from the base, a table resting on the upward end of the stud, the table stud and base being rigidly secured to each other, a rotatable support on the stud, a pointer for exploring the horizontal contour of the object of a given plane, a second pointer adapted to be moved by the first pointer to define enlarged contours of the object, and means between the pointers and the rotating support on the base for selectively fixing the pointers at different positions throughout 360° to conform to the contour variations of the object.

5. A projectometer for enlarging statuary etc. which comprises a supporting table for the statuary, a base for the table, a pair of interconnected pointers, supporting means between the pointers to the base adapted to be rotated throughout 360 degrees and adapted to position one of the pointers to follow the variable contours of the statue at variable distances from the horizontal and vertical axes of the statue and simultaneously position the other pointer at an enlarged distance from the critical horizontal and vertical axes of the statue, and means for adjusting the pointers to different horizontal and vertical positions while said pointers are rotatable entirely around the statue.

6. A projectometer comprising suitable base, a projection therefrom, a table supported on the projection, a pivoted member adapted for horizontal rotation on the projection between the base and the table, vertical extensions on such member, a pair of relatively long links pivoted to upper ends of the extensions on a horizontal axis, a plurality of pantographic members pivoted to said links, one carrying a tracing point and another member carrying an enlarging point, means for adjusting the points simultaneously on vertical planes independent of the horizontal axis of the extension, means for shifting the pointers to different related distances from the critical center of the object whereby one pointer will define contours of the object and the other pointer will establish contour points of enlargement on as many vertical planes as desired.

7. A projectometer having a suitable base, a stud projecting upward from the base, a table on the upper end of the stud, means for securing the table and stud rigidly to each other, a rotatable member pivoted on the stud, a pointer for exploring horizontal contours of an object on a given plane, a second pointer moved by the first pointer corresponding to enlarged contours of the object, and means between the pointers and the member for moving interconnected pointers into different positions in accordance with the contour variations of the object, said pointers being movable around the object on horizontal planes throughout 360°.

8. A projectometer comprising a supporting table for holding a statue, a base for the table, a pair of pointers, supporting means from the pointers to the base adapted to have a horizontal rotation of 360 degrees around the base adapted thereby to position one pointer on variable contours of the statue, pantographic means between the pointers for coordinately positioning the other pointer at an enlarged distance from a critical horizontal and vertical axis of the statue, and means for adjusting the pointers to different horizontal and vertical positions as desired.

9. A projectometer comprising a suitable support for holding an object in a definite fixed position, a base for the support, a pointer for contacting the surface of the object, a second pointer defining a similar position at a distance on an enlarged scale comparable to the surface of the object against which the tracing point rests, and means comprising pantographic connections for positioning both pointers in relation to the support at variable elevations in relation to the different contours of the object, means for moving the pointers as a unit on horizontal planes around the object throughout 360° whereby any configurations of the object on an enlarged scale is indicated by the second pointer and the said object and the enlargement thereof are on the same vertical center.

10. A projectometer which comprises a suitable support for holding an object in a definite fixed position with the selected axis of the object approximately perpendicular to the face of the support, a fixed base for the support having its center coincident with the selected axis of the object, a pointer for contacting the surface of the object, a second pointer pantographically connected to the first pointer defining a similar position at a distance from the first pointer on an enlarged scale comparable to the surface of the object against which the tracing point may rest, means for successively positioning both pointers for unitary movement concentric with the center of the support at variable elevations of the object the second pointer describing horizontal contours in proportionate concentric relation to the center of the base, and means for pivotally connecting the pointers between the support and the base around which the interconnected pointers may be moved anywhere within 360 degrees, whereby any configurations of the object is defined by the second pointer on an enlarged scale and the enlargement of the object is on the same vertical center around which the pantographically connected pointer may be moved.

WILLIAM E. URSCHEL.
GERALD W. URSCHEL.